US012097728B2

(12) United States Patent
Soini et al.

(10) Patent No.: US 12,097,728 B2
(45) Date of Patent: Sep. 24, 2024

(54) TIRE WITH A MODULE

(71) Applicant: Nokian Renkaat Oyj, Nokia (FI)

(72) Inventors: Teemu Soini, Tampere (FI); Atte Antikainen, Pirkkala (FI); Jani Räisänen, Pirkkala (FI); Jari Ojala, Nokia (FI); Mikko Turunen, Akaa (FI); Simo Vapaakoski, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 1015 days.

(21) Appl. No.: 16/978,791

(22) PCT Filed: Feb. 19, 2019

(86) PCT No.: PCT/EP2019/054062
§ 371 (c)(1),
(2) Date: Sep. 8, 2020

(87) PCT Pub. No.: WO2019/179707
PCT Pub. Date: Sep. 26, 2019

(65) Prior Publication Data
US 2021/0039451 A1    Feb. 11, 2021

(30) Foreign Application Priority Data
Mar. 19, 2018   (EP) .................................... 18397511

(51) Int. Cl.
*B60C 23/00*   (2006.01)
*B60C 23/04*   (2006.01)

(52) U.S. Cl.
CPC ...... *B60C 23/0493* (2013.01); *B60C 23/0488* (2013.01)

(58) Field of Classification Search
CPC .................. B60C 23/0491; B60C 23/0493
See application file for complete search history.

(56) References Cited

U.S. PATENT DOCUMENTS

| 4,071,724 | A  | 1/1978  | Lejeune        |
| 2002/0046791 | A1 | 4/2002  | Rensel et al.  |
| 2002/0174925 | A1 | 11/2002 | Wilson et al.  |

(Continued)

FOREIGN PATENT DOCUMENTS

| AT | 207810 T    | 11/2001 |
| CN | 101432153 A | 5/2009  |

(Continued)

OTHER PUBLICATIONS

Chinese Office Action for CN Application No. 201980020467.3 mailed Dec. 31, 2021 (24 pages, with English translation).

(Continued)

*Primary Examiner* — Justin R Fischer
(74) *Attorney, Agent, or Firm* — Merchant & Gould P.C.

(57) ABSTRACT

A tire, comprising a module and a receptacle connected to an inner surface of the tire. Therein, the receptacle comprises wall(s), which wall(s) limit(s) openings comprising at least a first opening and a second opening. Therein, part of the module extends through at least the second opening such that the wall(s) of the receptacle laterally surround(s) only a first part of the module such that at least a second part of the module is arranged outside the receptacle.

17 Claims, 7 Drawing Sheets

(56) References Cited

U.S. PATENT DOCUMENTS

2010/0186492 A1    7/2010  Morinaga
2014/0355648 A1   12/2014  Brusarosco et al.
2016/0031272 A1    2/2016  Peine et al.

FOREIGN PATENT DOCUMENTS

| | | |
|---|---|---|
| CN | 101432154 A | 5/2009 |
| CN | 106080056 A | 11/2016 |
| CN | 206485143 U | 9/2017 |
| CN | 107532052 A | 1/2018 |
| DE | 102011003134 A1 | 7/2012 |
| EP | 0689950 A2 | 1/1996 |
| EP | 0729826 B1 | 10/2001 |
| EP | 1721760 A1 | 11/2006 |
| EP | 1714806 * | 12/2009 |
| IN | 102164759 A | 8/2011 |
| JP | 2005-532551 A | 10/2005 |
| JP | 2006021611 A | 1/2006 |
| JP | 2010179888 A | 8/2010 |
| JP | 2017071341 A | 4/2017 |
| WO | 2004005054 A1 | 1/2004 |
| WO | 2005082644 A1 | 9/2005 |
| WO | 2006126215 A1 | 11/2006 |
| WO | 2013098711 A1 | 7/2013 |

OTHER PUBLICATIONS

Notice of Reasons for Refusal received for JP Application No. 2020-550605 on Nov. 17, 2022, 10 pgs.

* cited by examiner

TIRE WITH A MODULE

PRIORITY

This application is a U.S. national application of the international application number PCT/EP2019/054062 filed on Feb. 19, 2019, which claims priority of European application EP18397511.9 filed on Mar. 19, 2018, the contents of all of which are incorporated herein by reference.

TECHNICAL FIELD

The disclosed solution relates to tires comprising devices for sensing measures of interest such as air pressure or wear. The disclosed solution relates to apparatuses for reading sensing information from said devices.

BACKGROUND

It is known that tires may be equipped with devices for sensing measures of interest such as air pressure within a tire or wear of the tire. Typically such devices, such as wear indicators, are passive circuits such as LC (inductance-capacitance) circuits or RLC (resistance-inductance-capacitance) circuits incorporated in a tire, such as inserted into a tread block in the case of a wear indicator.

In order to make use of sensing data provided by such passive circuits, reading—or interrogating—devices are employed to read and further process, transmit, store and/or display said sensing data.

Currently, such reading devices are typically placed in a stationary position, for example in the body of a vehicle whose tire or tires are equipped with passive sensing circuits.

Thus, when a passive sensing circuit moves rapidly with the rotating tire, for example as installed into a tread block, and a reading device remains stationary with respect to the rotating axis of the tire, the interaction between the passive sensing circuit and the reading device is only intermittent and/or unreliable, because the mutual distance and the relative position of the passive circuit and the reading device are constantly and rapidly changing when the tire rotates. For example, when a typical passenger car travels at 100 km/h, its tires undergo about 14 revolutions per second. In such a case, the distance between the passive circuit in a tire and a car-mounted stationary reader varies by approximately 65 cm 28 times per second, making constant and reliable interaction between a passive circuit in a tire and the reading device practically impossible.

In order to read measures of interest sensed by passive circuits incorporated in tires more accurately and reliably, a more reliable interaction between a passive circuit and a reading device—for example a module such as an electronic module—is required, such that the solution does not compromise secure installation of the reading device.

In addition or alternatively, active sensors comprising a power source have been applied inside a tire, e.g. for measuring tire pressure.

A problem encountered in such tires is bonding the active sensor and/or reading device to the tire in a reliable manner.

SUMMARY

The disclosed solution is premised on a tire comprising a module in the tire itself. Such a module may be, for example, an electronic module.

Such a module, especially if electronic, may serve as a reading device for one or more passive circuits incorporated in the tire. In addition, or alternatively, the module itself, especially if electronic, may comprise a sensor for sensing a measure of interest.

According to the disclosed solution, the tire comprises a receptacle connected to an inner surface of the tire, into which receptacle a part of the module can be installed.

Thereby, for example, an electronic module may be fixedly positioned close to a passive circuit or circuits for which the electronic module may serve as a reading device. Such an arrangement enables reliable interaction between the electronic module and the passive circuit(s). In addition, or alternatively, such an arrangement enables the electronic module to be equipped with a sensor for sensing a measure of interest, such as air pressure, prevailing inside the tire.

Furthermore, according to the disclosed solution, the receptacle comprises a wall or walls which limits or limit at least a first opening and a second opening such that part of the module—such as its antenna or a part of it—extends through at least the second opening. Thus, according to the disclosed solution, the wall(s) of the receptacle laterally surround(s) only a first part of the module such that the rest of the module—such as at least a part of its antenna—is arranged outside the receptacle. In the case of the antenna being thusly arranged, the part of the antenna that is arranged outside the receptacle is electrically connected to the first part of the module which is surrounded by the wall or walls of the receptacle.

Such an arrangement enables keeping the module more securely in place by providing mechanical support for the module especially in the radial direction, and by preventing the module from rotating within the receptacle.

Furthermore, by arranging at least part of the antenna to be the part or one of the parts of the module which reside(s) outside the receptacle has the benefit of foregoing the need to arrange an additional extending member or members in the module to extend through at least the second opening of the receptacle.

Further still, by arranging at least part of the antenna to be the part or one of the parts of the module which resides outside the receptacle has the additional benefit of improving the signal strength of the antenna as the signal is not obstructed by the wall(s) of the receptacle and/or the other parts of the module housed within the receptacle.

BRIEF DESCRIPTION OF THE DRAWINGS

The Figures are intended to illustrate the general principles of the disclosed solution. Therefore, the illustrations in the Figures are not necessarily in scale or suggestive of precise layout of system components.

DETAILED DESCRIPTION

Figure 1:
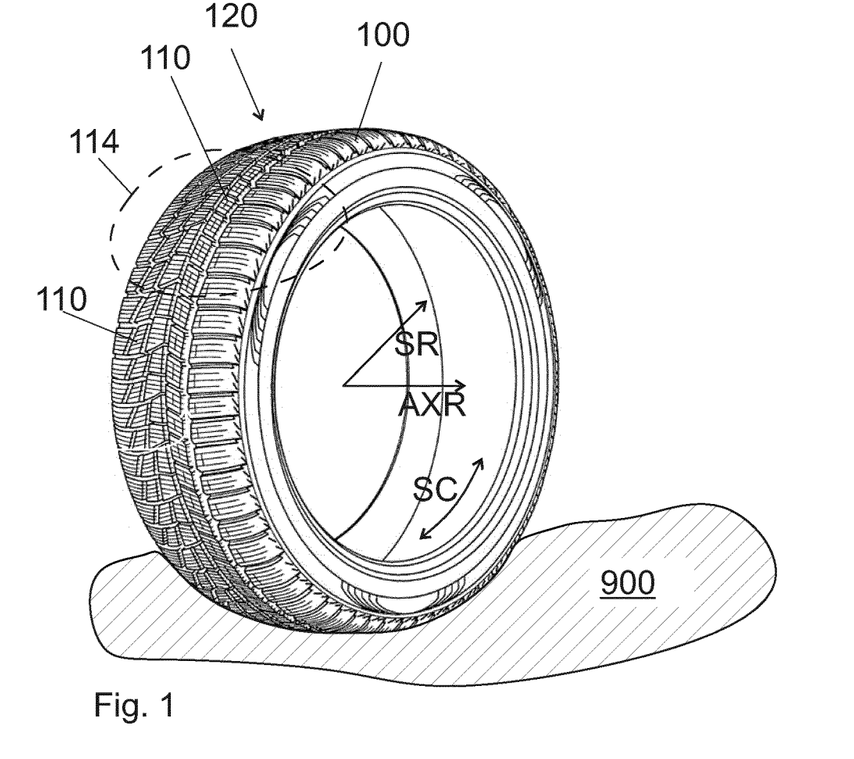
FIG. 1 illustrates a tire.

In the text, references are made to the Figures with the following numerals and denotations:
100 Tire
110 Tread block
114 Tread pattern
120 Tread, of tire
130 Inner surface, of tire
150 Reinforcing belt
155 Ply
190 Indicator
200 Passive circuit
210 Secondary capacitive component
220 Secondary inductive component
250 Resistive component
300 Module
301 First part, of module
302 Second part, of module
303 Third part, of module
310 Communication circuit
312 Antenna
320 Primary inductive component
330 Power source
340 Sensor
350 Component, made from paramagnetic or ferromagnetic material
400 Receptacle
402 Wall, of receptacle
403 Floor, of receptacle
405 Flange, of receptacle
407 First end, of receptacle
408 Second end, of receptacle
410 First opening, of receptacle
420 Second opening, of receptacle
430 Third opening, of receptacle
450 Protrusion
455 Bulge
460 Adhesive
900 Surface
$A_{405}$ Cross sectional area, of flange
$A_{408}$ Cross sectional area, of second end, of receptacle
AXR Axis of rotation, of tire
$h_{450}$ Height, of protrusion
$d_{320}$ Distance, between primary inductive component and inner surface of tire
$d_{330}$ Distance, between power source and inner surface of tire
$d_{350}$ Distance, between component and inner surface of tire
SC Circumferential direction
SR Radial direction Referring to FIG. 1, the disclosed solution relates to a tire 100. Preferably, such a tire 100 is a pneumatic tire.

Such a 100 tire may be, for example, a tire for a passenger vehicle, such as a passenger car or a motorcycle. Such a tire 100 may be, for example, a so-called heavy tire, for a heavy machine such as a truck, a caterpillar, a harvester or a front loader.

Such a tire 100 typically comprises a tread 120, which is in contact with a surface 900 such as a road surface during the normal use of the tire 100. Such a tread 120 typically comprises a tread pattern 114 which comprises a plurality of tread blocks 110.

Figure 3A:
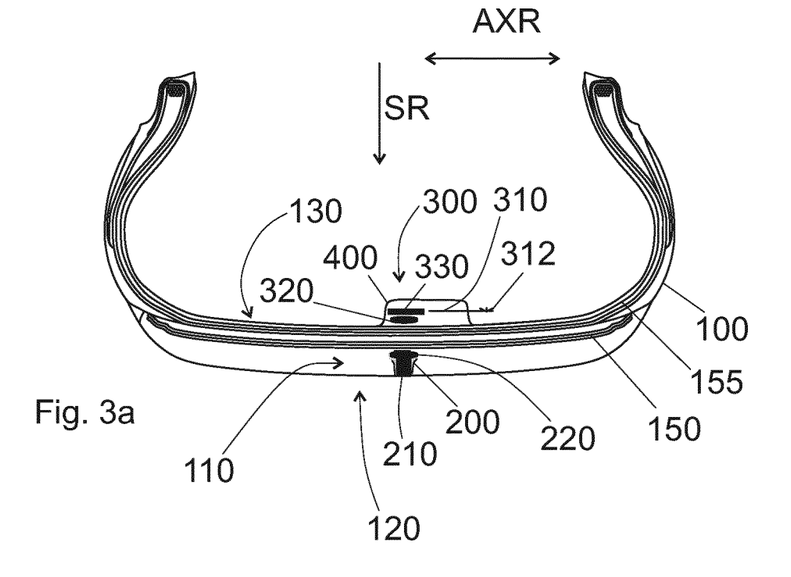
FIG. 3a illustrates, in a half cross section, a tire comprising an indicator.
Figure 3B:
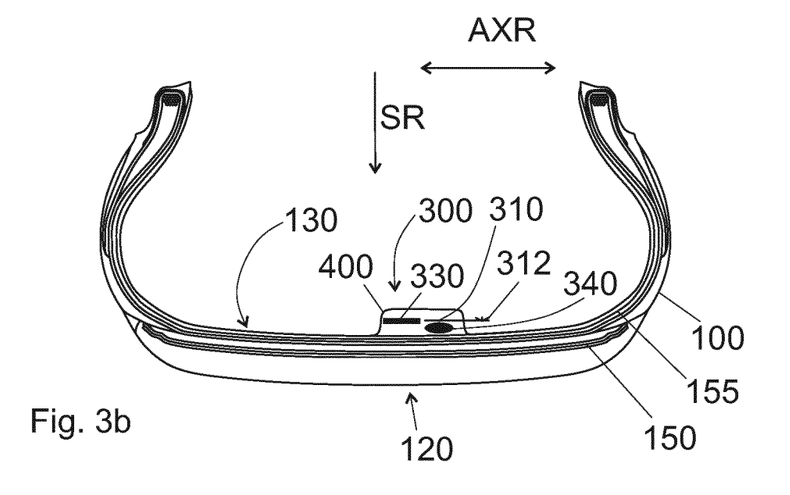
FIG. 3b illustrates, in a half cross section, a tire comprising an active sensor without a separate passive circuit.

As is typical for certain types of tires 100, and as is illustrated in FIGS. 3a-3b, the tire 100 may comprise a reinforcing belt 150 arranged between the tread 120 and the inner surface 130 of the tire 100.

As is known, such a tire 100 may rotate around an axis of rotation AXR, in which case an outward centrifugal force acts on the constituent parts of the tire 100 along a radial direction SR.

According to the disclosed solution, such a tire 100 comprises a module 300 as described more in detail below.

Preferably, such a module 300 is electronic, i.e. an electronic module 300. In the interest of straightforwardness of description, below the notion of "electronic module" 300 is employed. However, it is to be appreciated that what is disclosed below concerning the installation to and residence in a tire 100 of an electronic module 300—especially with respect to a receptacle 400—applies to other kinds of modules 300 as well.

An electronic module 300 comprises a power source 330, preferably an electric power source 330, to provide electricity for powering the functionality of the electronic module 300, an antenna 312 to provide wireless connectivity, and a communication circuit 310 to perform measurements and communication via the antenna 312. Typically, the power source 330 is a battery configured to provide electricity by converting chemical energy into electricity. Alternatively or in addition, the power source 330 may comprise an energy harvesting device, such as a piezoelectric energy harvesting device or a triboelectric energy harvesting device, which device may comprise a battery and/or a capacitor as one of its elements.

In addition, the tire 100 may comprise a passive circuit 200. In such a case, the electronic module 300 and the passive circuit 200 together constitute an indicator 190.

Figure 2A:
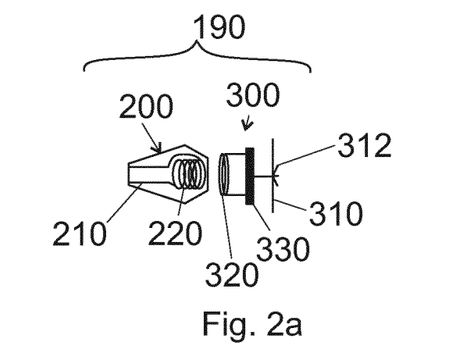
FIG. 2a illustrates, as viewed from a side, an indicator comprising a passive circuit and a module.
Figure 2B:
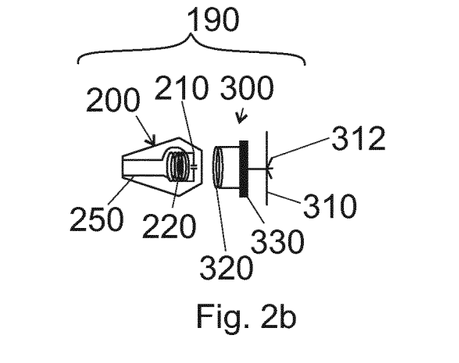
FIG. 2b illustrates, as viewed from a side, an indicator comprising a passive circuit and a module.

Now referring to FIGS. 2a and 2b, a tire 100 may comprise an indicator 190 to indicate a measure or measures of interest. Such measures of interest may include, for example, the pressure prevailing inside a pneumatic tire 100, the degree of wear of the tread 120, the conditions such as moisture prevailing in the immediate environment outside the tire 100, or force(s) to which the tire 100 is subjected to.

Such an indicator 190 comprises a passive circuit 200 configured to sense a measure or measures of interest, and an electronic module 300 configured to interact with the passive circuit 200 and thereby read the result of the sensing of the measure(s) of interest.

That the passive circuit 200 is "passive" means that it does not comprise a part capable of producing energy, such as a power source. That is, the passive circuit 200 may consume energy but does not itself produce such energy. In particular, the passive circuit 200 does not comprise a battery that is configured convert chemical energy into electricity. However, the passive circuit 200 may comprise a secondary inductive component 220 configured to extract electricity from an electromagnetic field.

The passive circuit 200 may be a so-called LC circuit comprising at least one inductive component (L) such as a secondary inductive component 220 and at least one capacitive component (C) such as a secondary capacitive component 210, as is illustrated according to an example in FIG. 2a. In such a case, if the passive circuit 200 is arranged to sense the wear of the tread 120 for example, the secondary capacitive component 210 may wear with the tread 120 as a consequence of the passive circuit 200 having been inserted into the tread 120, whereby the sensing of the wear of the tread 120 may be premised on the wear-induced change in the capacitance of the capacitive component 210.

The passive circuit 200 may be a so-called RLC circuit comprising at least one resistive component (R) such as a resistive component 250, at least one inductive component (L) such as a secondary inductive component 220 and at least one capacitive component (C) such as a secondary capacitive component 210, as is illustrated according to an example in FIG. 2b. In such a case, if the passive circuit 200 is arranged to sense the wear of the tread 120 for example, the resistive component 250 may wear with the tread 120 as a consequence of the passive circuit 200 having been inserted into the tread 120, whereby the sensing of the wear of the tread 120 may be premised on the wear-induced change in the resistance of the resistive component 250.

The interaction between the passive circuit 200 and the electronic module 300 arises, as is generally known for LC and RLC circuits, from the secondary inductive component 220 being capable of transforming magnetic energy into electricity, which becomes temporarily stored in the primary capacitive component 210. Such magnetic energy may originate from a primary inductive component 320 of the electronic module 300. The electronic module 300 may thereby comprise an energy source, such as a power source 330, for example a battery, to provide energy for the components and functioning of the electronic module 300, including in some cases the primary inductive component 320. Consequently, the interaction between the passive circuit 200 and the electronic module 300 may be premised on the mutual inductance of the secondary inductive component 220 and the primary inductive component 320. That is, the primary inductive component 320 and the secondary inductive component 220 may be in an electromagnetic connection with each other.

Thus, the electronic module 300 and the passive circuit 200 may interact wirelessly, with the above-described mutual inductance-based implementation being one possible example to realize such wireless interaction.

Such wireless interaction between the electronic module 300 and the passive circuit 200 is particularly beneficial in a tire 100 comprising a reinforcing belt 150 arranged between the tread 120 and the inner surface 130 of the tire 100, as the electronic module 300 and the passive circuit 200 may be located such that the reinforcing belt 150 is between them, as illustrated in FIG. 3a according to an example. In such a case, the benefit of wireless interaction between the electronic module 300 and the passive circuit 200 arises at least from the possibility of foregoing penetrating the reinforcing belt 150 with a physical communication channel between the electronic module 300 and the passive circuit 200, which penetration would negatively influence the structural integrity of the reinforcing belt 150 and/or necessitate complicated compensatory arrangements in the reinforcing belt 150.

Figure 5A:
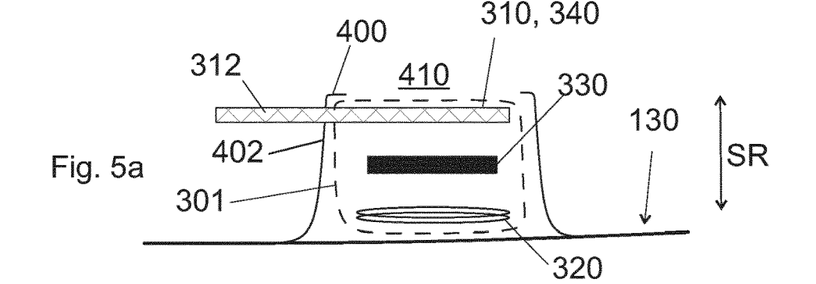
FIGS. 5a-5e illustrate, in cross sections viewed from a side, a module installed in a receptacle, according to examples.

Referring back to FIGS. 2a and 2b, the electronic module 300 comprises an antenna 312. Such an antenna 312 may be incorporated in a communications circuit 310 of the electronic module 300, or it may be separate from but in electric connection to the communications circuit 310. For example, as indicated in FIG. 5a, the antenna 312 may be formed onto the same circuit board, onto which the communications circuit 310 is bonded. The circuit board may be flexible.

Such an antenna 312 may be arranged to wirelessly transmit information from the electronic module 300 to a receiving device (not illustrated) located at a distance from the tire 100. Such a receiving device may be, for example, a device temporarily or permanently installed in a vehicle equipped with the tire 100, a cellular telephone of a driver or a passenger of said vehicle, or a diagnostic device at a workshop. Though not illustrated, such a receiving device may further transmit said information to, for example, a computer server or to a cloud service.

The information that the antenna 312 is configured to transmit may concern the sensing of a measure of interest with the passive circuit 200 read with the electronic module 300, as indicated in FIG. 3a. Alternatively, or in addition, the information that the antenna 312 is configured to transmit may concern the sensing of a measure of interest with a sensor 340 of the electronic module 300 itself, as indicated in FIG. 3b. Thus, with the antenna 312, sensing—and/or any other—information may be wirelessly conveyed from the electronic module 300 to elsewhere for useful displaying, analysis and/or diagnostic purposes. Such conveyance of information may be two-way, i.e. to and from the electronic module 300. Such conveyance of information may be premised, for example, on a Bluetooth data connection.

Whereas the wireless interaction between the passive circuit 200 and the electronic module 300, as described above, typically operates in the range or millimeters or centimeters, the wireless interaction between the electronic module 300 comprising the antenna 312 and a receiving device at a distance from the tire 100 preferably operates in a greater range, such as in the range of tens of centimeters to meters. For example, Bluetooth data connection has a maximum range of meters to tens of meters or more, depending on conditions and the Bluetooth protocol version being used.

Now referring to FIG. 3a, the tire 100 may comprise the passive circuit 200 as inserted into the tread 120, such as inserted into a tread block 110. Thereby, the passive circuit 200 may be capable of sensing measures of interest such as the wear of the tread 120. The passive circuit 200 may be installed into the tire 100 upon manufacturing the tire 100, immediately following the manufacturing the tire 100 or as an aftermarket installation for example by a third party. The tire 100 may comprise one or more passive circuits 200, for example two or more passive circuits 200 for sensing two or more measures of interest. However, referring to FIG. 3b, the tire 100 need not comprise the passive circuit 200. Moreover, as indicated in FIG. 3b, when a passive circuit 200 is not used, the electronic module 300 need not comprise a primary inductive component 320 configured to electromagnetically interact with the passive circuit 200.

In the interest of the interaction between the passive circuit 200 and the electronic module 300, as described earlier, the electronic module 300 is preferably positioned on the inner surface 130 of the tire 100 such that the primary inductive component 320 of the electronic module 300 and the secondary inductive component 220 of the passive circuit 200 are substantially aligned with respect to the axial direction along the axis of rotation AXR and a circumferential direction SC of the tire.

For proper operation of the module 300, the electronic module 300 should be fixed to the tire 100 in a reliable manner, and possibly also in a correct position.

Figure 4A:
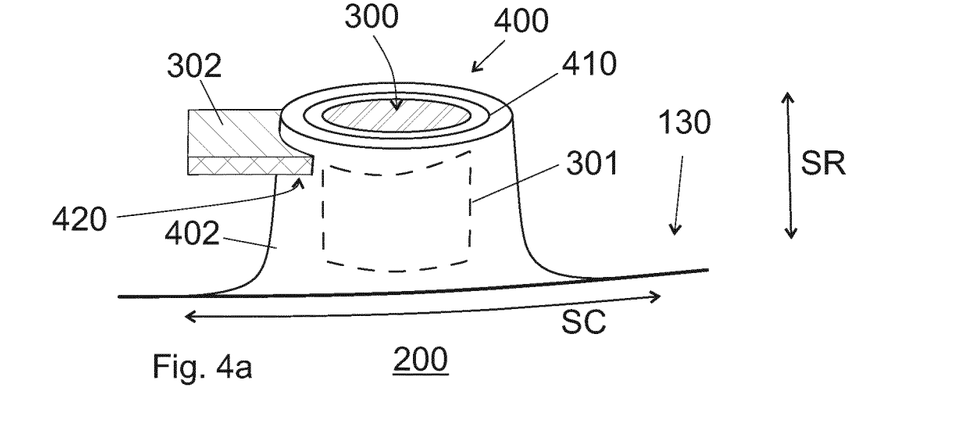
FIG. 4a-4c illustrate, as viewed diagonally form a side, a module installed in a receptacle, according to examples.
Figure 4B:
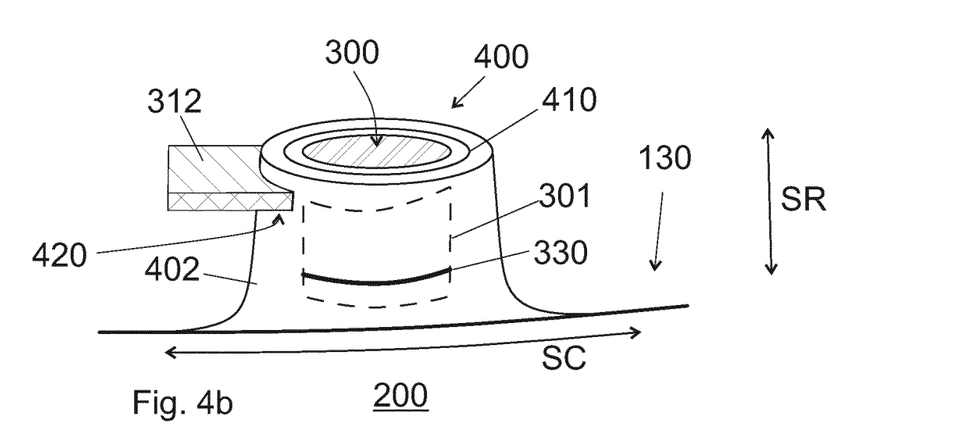
Figure 4C:
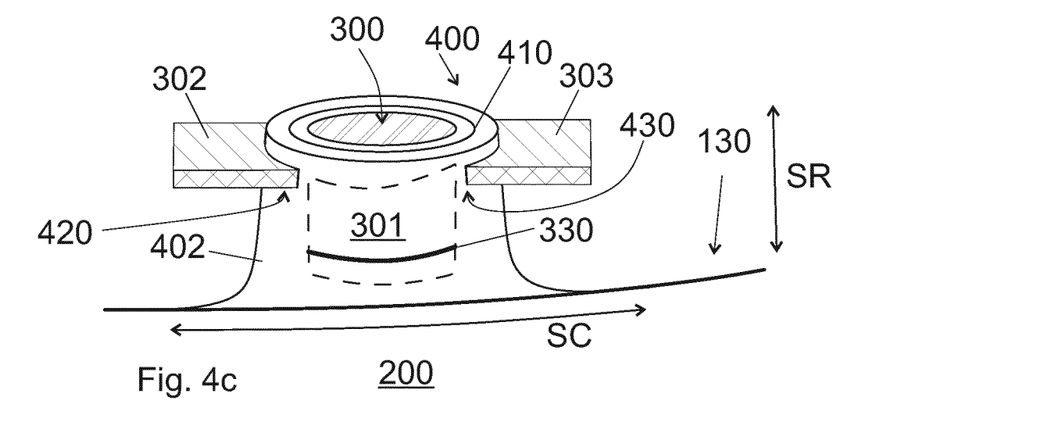

Referring to FIGS. 4a-4c, the positioning of the electronic module 300 on the inner surface 130 of the tire 100 can be brought about by arranging in said position on the inner surface 130 of the tire 100 a receptacle 400 into which at least part of the electronic module 300 may be installed. That is, according to the disclosed solution there is a receptacle 400 connected to the inner surface 130 of the tire 100 such that the receptacle 400 is adapted to receive and house at least part of the electronic module 300.

The electronic module 300 or at least a part of it may be installed into the receptacle 400 upon manufacturing the tire 100, immediately following the manufacturing the tire 100 or as an aftermarket installation for example by a third party.

The receptacle 400 may be manufactured directly to the tire 100 e.g. during vulcanization. However, preferably, the receptacle 400 is fixed to the tire 100 after the tire 100 has been vulcanized. This allows for using conventional manufacturing methods for the tire 100 itself. The receptacle 400 may be fixed to the tire 100 by, for example, using a suitable adhesive as disclosed below.

The electronic module 300 or at least part of it may be secured in its installing position within the receptacle 400 with mechanical support in accordance with what is described below. In addition, further securing may be provided by arranging castable material between the receptacle 400 and the electronic module 300 or that part of the electronic module 300 which is installed in the receptacle 400. For example, the receptacle 400 may serve as a mold for the electronic module 300 such that the electronic module 300 is inserted into the receptacle 400, after which the castable material is mold into the receptacle 400. Such castable material may be adhesive. Such castable material may be, for example, epoxy, polyurethane, acrylic, silicone, or another thermoset polymer or thermoplastic polymer-based adhesive.

Figure 6A:
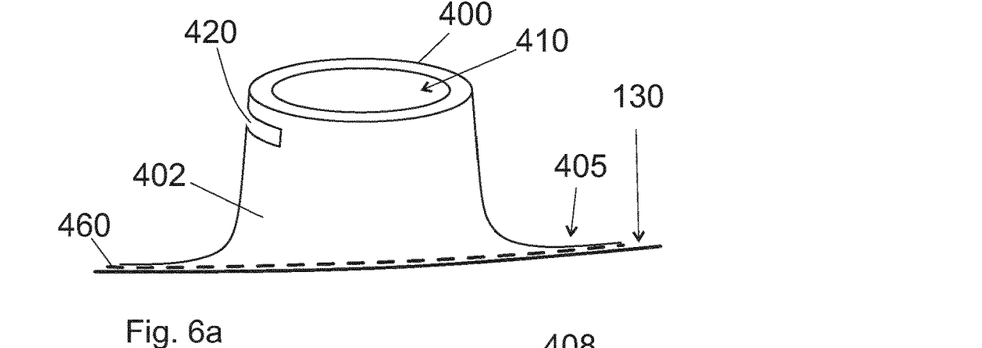
FIG. 6a illustrates, as viewed diagonally from a side, a receptacle adhesively attached to the inner surface of a tire.

As illustrated in FIG. 6a, such a receptacle 400 may be connected to the inner surface 130 of the tire 100 adhesively. In such a case, there is adhesive 460 between the receptacle 400 and the inner surface 130 of the tire 100. Such adhesive 460 may comprise, for example, thermoset polymer or thermoplastic polymer-based adhesive. Suitably, the adhesive 460 is selected from a group comprising epoxy, polyurethane, acrylic and acrylic.

If the tire 100 comprises a passive circuit 200 and a reinforcing belt 150 arranged between the tread 120 and the inner surface 130, as in the example illustrated in FIG. 3a, the reinforcing belt 150 is located between the electronic module 300 and the passive circuit 200. In such a case, the reinforcing belt 150 is arranged in between the primary inductive component 320 of the electronic module 300 and the secondary inductive component 220 of the passive circuit 200.

Now referring to FIG. 6a, the receptacle 400 comprises a wall or walls 402. Such wall(s) 402 may comprise, for example, polymer material, such as rubber or another thermoplastic elastomer.

For example, as specifically illustrated in FIG. 6a, the receptacle 400 may comprise a substantially circular wall 402. As another example, the receptacle 400 may comprise more than one walls 402, such as four walls as in the specific examples illustrated in FIGS. 7b and 7d.

The wall(s) 402 provide support for the electronic module 300 or that part of the electronic module 300 which is installed in the receptacle 400. For additional support especially along the radial direction SR, the inner side(s) of the wall(s) 402 may comprise surface roughness. Such surface roughness may provide increased friction or grip between the electronic module 300 and the inner side(s) of the wall(s) 402 of the receptacle 400 and/or between the above-mentioned castable material and the inner side(s) of the wall(s) 402 of the receptacle 400. The roughness value $R_a$ of such surface roughness may be, for example, at least 5 micrometers. Such surface roughness may be brought about, for example, by sandblasting, or it may be an inherent manufacturing-induced property of the wall(s) 402. The preceding applies, mutatis mutandis, to the surface roughness of the electronic module 300 as well.

According to the disclosed solution the wall(s) 402 of the receptacle 400 limit(s) at least a first opening 410 and a second opening 420. Thus, the wall(s) 402 of the receptacle 400 may limit, as illustrated in FIG. 6a, a first opening 410 and a second opening 420. As an alternative, the wall(s) 402 of the receptacle 400 may limit, as illustrated in FIG. 6e, a first opening 410, a second opening 420 and a third opening 430. As another alternative, the wall(s) 402 of the receptacle 400 may limit a first opening 410 and a second opening 420 and a third opening 430 and a fourth opening (not specifically illustrated)—and so on. That is, there may be, in addition to the first opening 410, one or more openings to the side of the receptacle 400 in its wall(s) 402.

The second opening 420, like the third opening 430 and/or any additional openings to the side of the receptacle 400, serves the purpose of enabling a part of the electronic module 300 to extend through the second opening 420, whereby the wall(s) 402 laterally surround(s) only the first part 301, i.e. the rest, of the electronic module 300. In other words, only the first part 301 of the electronic module 300 is housed within the receptacle 400 while a second part 302 of the electronic module 300 extends through the second opening 420 to outside the receptacle 400. Thus, a part of the second part 302 remains outside the receptacle 400. The extending of the second part 302 of the electronic module 300 to outside the receptacle 400 through the second opening 420 has the technical effect of keeping the electronic module 300 more securely in place by providing mechanical support for the electronic module 300 especially in the radial direction SR, and by preventing the electronic module 300 from rotating within the receptacle 400. For example, the wall(s) 402 may laterally surround at least the power source 330 of the electronic module 300.

As already suggested above, the same principles apply to the extension of parts of the electronic module 300 to outside the receptacle 400 in the case of and through more than one opening to the side of the receptacle 400. Such is illustrated according to an example in FIG. 4c in the case of two such openings: a second part 302 of the electronic module 300 remaining outside the receptacle 400 by extending through a second opening 420 and a third part 303 of the electronic module 300 remaining outside the receptacle 400 by extending through a third opening 430.

The part or parts of the electronic module 300 thusly arranged outside the receptacle 400 may comprise, for example, the antenna 312 or at least a part of the antenna 312, as illustrated in FIG. 4b. Antennas or parts of the antenna 312 could be arranged to the second part 302 and third part 303 of the module 300 in the structure of FIG. 4c. To enable its wireless information transmittal functionality, the antenna 312 is electrically connected to the first part 301 of the electronic module 300 which is surrounded by the wall(s) 402 of the receptacle.

By arranging at least part of the antenna 312 to be the part of the electronic module 300 which resides outside the receptacle has the benefit of foregoing the need to arrange an additional extending member or members in the electronic module 300 to extend through the second opening 420 and possibly the third 430 and further such openings of the receptacle 400.

By arranging at least part the antenna 312 to be the part of the electronic module 300 which resides outside the receptacle 400 has the additional benefit of improving the signal strength of the antenna 312 as the signal is not obstructed by the wall(s) 420 of the receptacle 400 and/or the other parts of the electronic module 300 housed within the receptacle 400. This may be particularly advantageous in a tire 100 comprising a reinforcing belt 150 arranged between the electronic module 300 and the passive circuit 200 because the reinforcing belt 150, especially if comprising steel, may already dampen the signal between the antenna 312 and any receiving device outside the tire 100.

Now referring to FIG. 6a, the first opening 410 of the receptacle 400 may be configured such that the electronic module 300 may be inserted and/or molded into the receptacle 400 via the first opening 410 in accordance with what has been delineated above. That is, the first opening 410 may be dimensioned such that it allows for installing and/or molding the electronic module 300 into the receptacle 400 via the first opening 410 such that after such installing and/or molding, a part of the electronic module 300 resides outside the receptacle 400 by way of extending through at least the second opening 420.

Figure 6B:
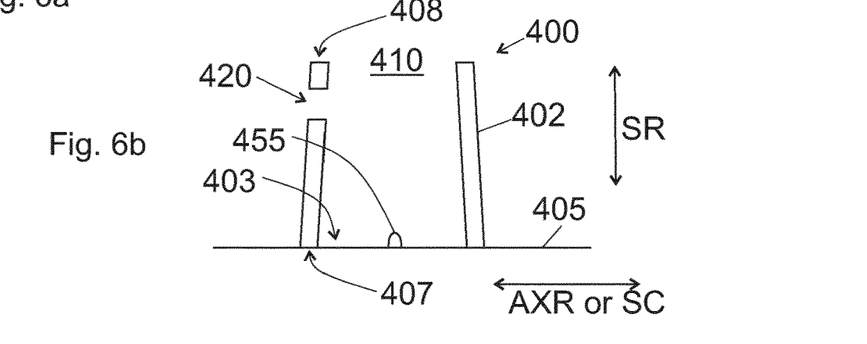
FIG. 6b illustrates, in a cross section viewed from a side, a receptacle comprising a bulge.
Figure 6C:
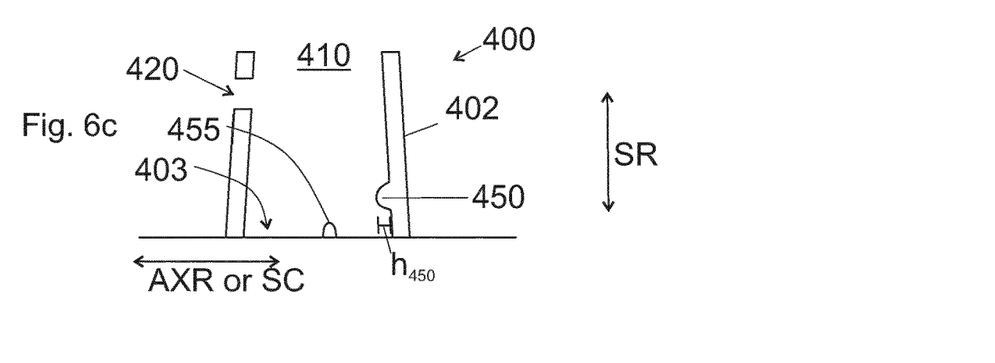
FIG. 6c illustrates, in a cross section viewed from a side, a receptacle comprising a protrusion and a bulge.
Figure 6D:
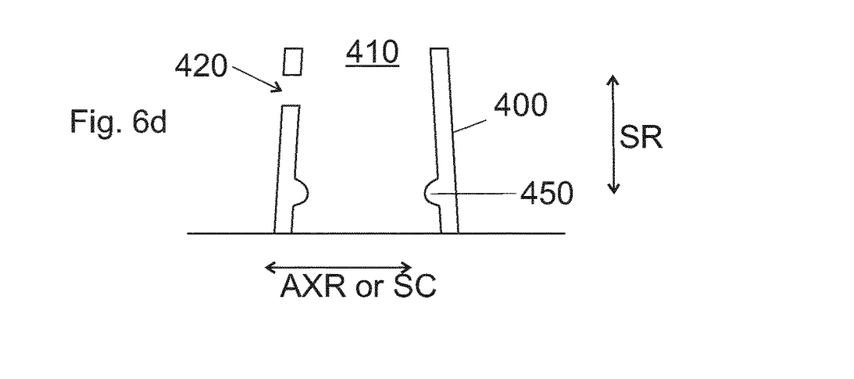
FIG. 6d illustrates, in a cross section viewed from a side, a receptacle comprising a protrusion or protrusions.
Figure 6E:
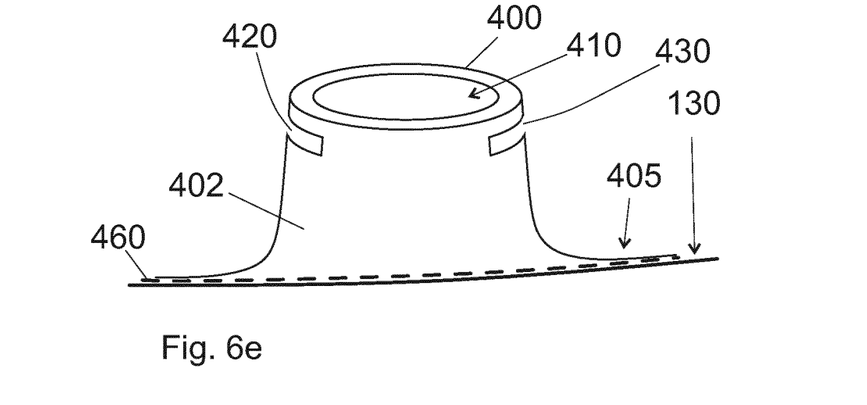
FIG. 6e illustrates, as viewed diagonally from a side, a receptacle adhesively attached to the inner surface of a tire.
Figure 6F:
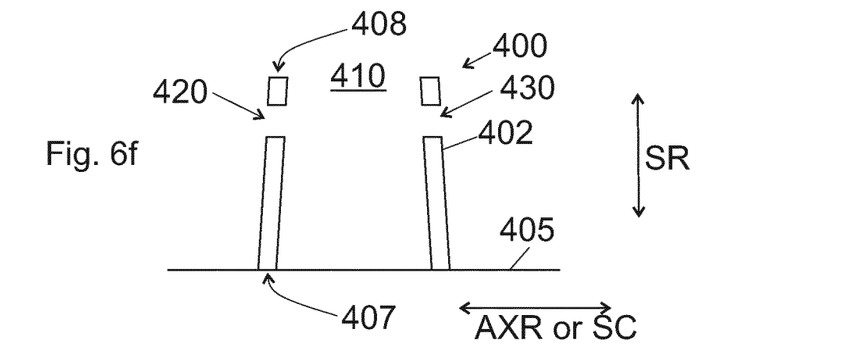
FIG. 6f illustrates, in a cross section viewed from a side, a receptacle.

As is illustrated in FIGS. 6b-6d according to examples, the receptacle 400 may be arranged such that a first end 407 of the receptacle 400 is connected to the inner surface 130 of the tire 100, and the second end 408, which is opposite to the first end 407, limits the first opening 410. That is, the first end 407 may be against and attached to the inner surface 130 of the tire, while the second end 408 defines the first opening 410 of the receptacle 400. In such a case, the receptacle 400 may first be attached to the inner surface 130 of the tire, and afterwards the electronic module 300 may be installed in the receptacle 400 in consistency with what has been described above about the partial residence of the electronic module 300 in its installed position within the receptacle 400.

As is illustrated in FIGS. 6b-6d according to examples, the receptacle 400 may have such a shape that the interior of the receptacle 400, which is configured to receive the first part 301 of the electronic module 300, tapers towards the first opening 410. This has the effect that the wall(s) 402 resist a movement of the electronic module 300 out from the receptacle 400.

As is illustrated in FIG. 6a, the first end 407 of the receptacle 400 may comprise a flange 405 such that the flange 405 is connected to the inner surface 130 of the tire 100 when the receptacle 400 is connected to the inner surface 130 of the tire 100. Such a flange 405 may extend laterally outward from the wall(s) 402 of the receptacle. That is, as viewed from above, like in FIGS. 7a-7d, the circumference of the receptacle 400 may be greater at the first end 407 comprising the flange 405 than at the second end 408. In such a case, the cross sectional area $A_{405}$ of the flange 405 is greater than the cross sectional area $A_{408}$ of the second end 408 of the receptacle, wherein the second end 408 is opposite to the flange 405. The cross sectional area $A_{405}$ of the flange 405 may be, for example, at least 5% greater than the cross sectional area $A_{408}$ of the second end 408 of the receptacle, such as at least 10% or 20% or 40% or 60% or 80% or 100% or 150% or 200% greater.

Such a flange 405 has the benefit of providing a greater contact area between the receptacle 400 and the inner surface 130 of the tire 100. Thus, if the receptacle 400 is adhesively connected to the inner surface 130 of the tire 100, the flange 405 provides a greater area for adhesive 460, thereby enabling a stronger adhesive force between the receptacle 400 and the inner surface 130 of the tire 100.

Figure 7A:
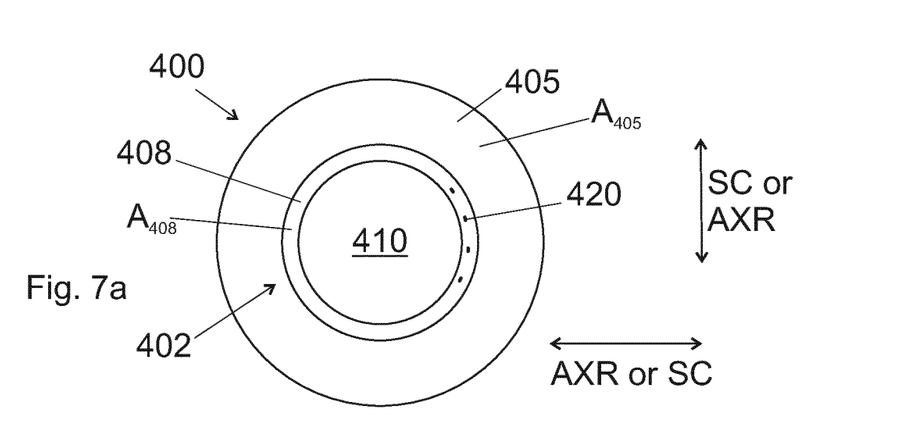
FIGS. 7a-7d illustrate, as viewed from above, a receptacle comprising a flange, according to examples.
Figure 7B:
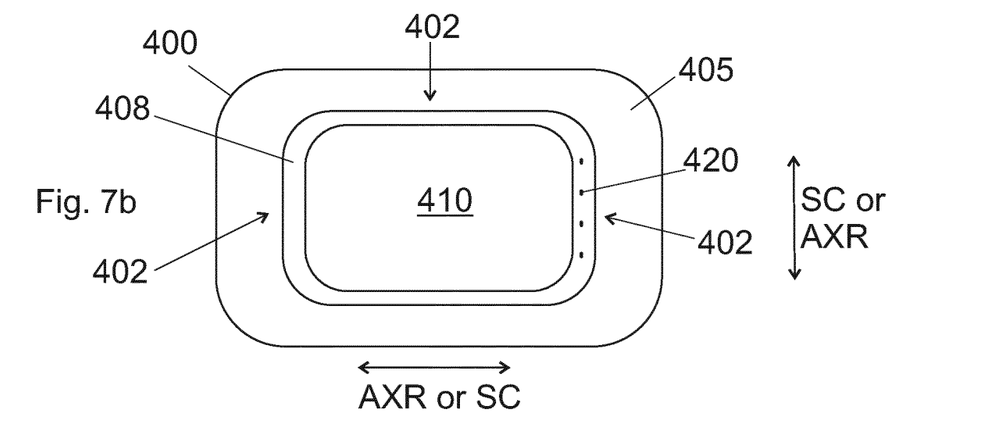
Figure 7C:
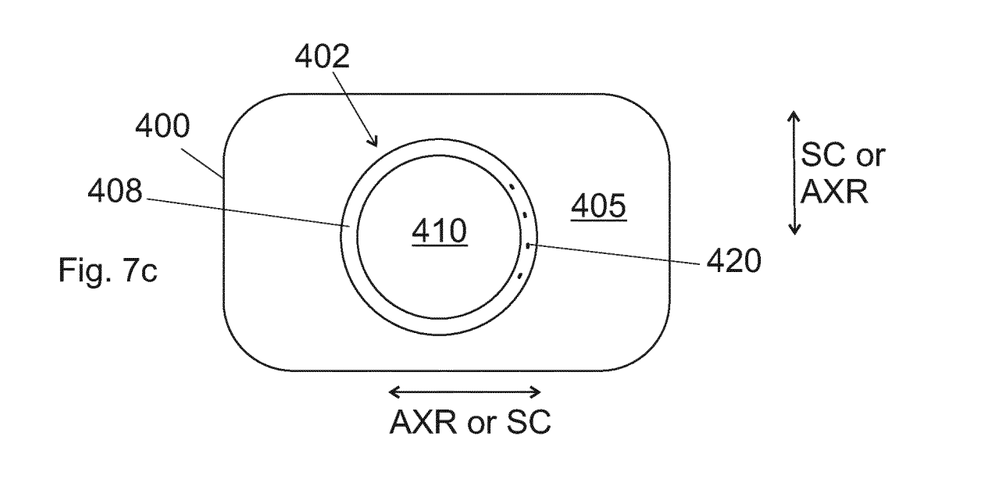
Figure 7D:
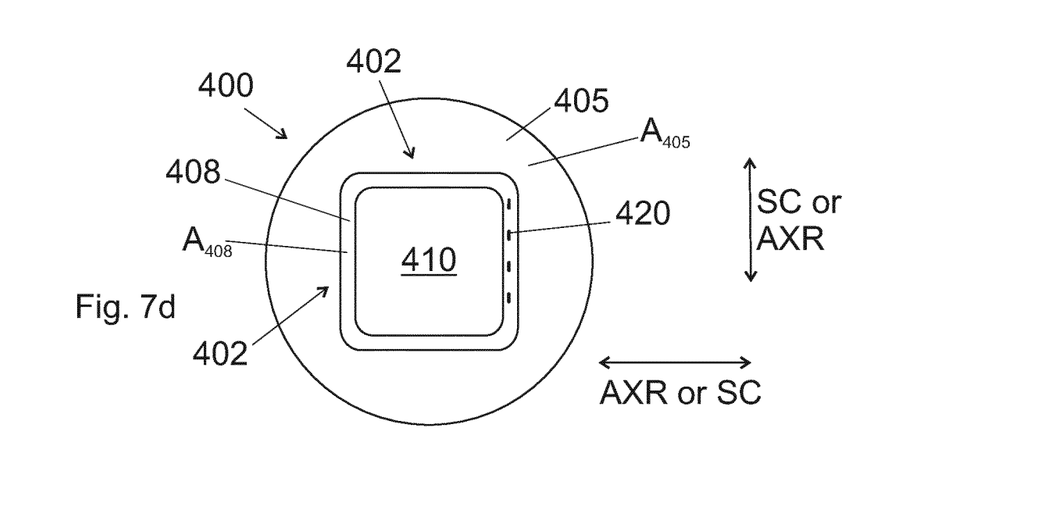

Such a flange 405 may be circular or substantially circular as illustrated in FIGS. 7a and 7d according to examples. Alternatively, such a flange 405 may be non-circular or substantially non-circular as illustrated in FIGS. 7b-7c according to examples.

The flange 405 and the receptacle 400 may both be circular as illustrated in FIG. 7a, or they may both be non-circular as illustrated in FIG. 7b, or one of them may be circular and the other non-circular as illustrated in FIGS. 7c and 7d. Herein, it is to be understood that the shape of the receptacle 400, as illustrated in FIGS. 7a-7d, essentially refers to the cross-sectional shape of the second end 408 of the receptacle 400 as viewed from above; e.g. in a radial direction SR of the tire (see FIGS. 3a and 3b).

Such a flange 405 may comprise the same material as the wall(s) 402 of the receptacle 400. Alternatively, such a flange 405 may comprise a different material or materials than the wall(s) 402 of the receptacle 400. Such a flange may comprise, for example, polymer material such as rubber or another thermoplastic elastomer. Such a flange 405 may comprise reinforcements such as cords or fibers embedded within the flange 405.

The receptacle 400 may be manufactured, for example, by molding such as injection molding or compression molding. Different materials, such as different varieties of rubber, may be used in the construction of the receptacle 400 in accordance with what is described above by, for example, curing the preformed receptacle 400 such that the different materials may be thereby joined together. Different materials may be used in the construction of the receptacle 400 in accordance with what is described above also by, for example, joining the constitutive elements together by known methods such as by adhesion.

Now referring to FIGS. 6b-6d, a part of the wall(s) 402 of the receptacle 400 may be arranged in between the second end 408 of the receptacle 400 and the second opening 420. Moreover, a part of the wall(s) 402 of the receptacle 400 may be arranged in between the first end 407 of the receptacle 400 and the second opening 420. Thus, the antenna 312 or that part of it which extends through the second opening 420 of the receptacle may be at a distance from the inner surface 130 of the tire 100. Such an arrangement has the benefit of allowing some design freedom with respect to the dimensions and/or the shape of the antenna 312 because the antenna 312 or that part of it which extends through the second opening 420 to outside the receptacle 400 does not need to conform to the inner surface 130 of the tire 100. Furthermore, a distance between the antenna 312 and the surface 130 of the tire has the benefit of not directly mechanically subjecting the antenna 312 to the impacts experienced by the tire 100 and transmitted to the inner surface 130 of the tire, as the antenna 312 is not in a direct contact with the inner surface 130. Further still, the part of the wall(s) 402 of the receptacle 400 that is arranged in between the second end 408 of the receptacle 400 and the second opening 420 mechanically supports the electronic module 300 particularly in the radial direction SR. The same applies if the receptacle 400 comprises a third 430 and possibly further openings to the side of the receptacle 400.

Referring to FIGS. 6c and 6d, the wall(s) 402 of the of receptacle 400 may comprise a protrusion 450 or several protrusions 450. Such protrusion(s) 450 may be located inside the receptacle 400 and protrude inwards. That is, such protrusion(s) 450 may protrude towards the first part 301 of the electronic module 300 which is surrounded by the wall(s) 402 of the receptacle 400, with respect to the installed position of the electronic module 300 within the receptacle 400.

If the wall(s) 402 of the of receptacle 400 comprise a protrusion 450 or several protrusions 450, preferably the electronic module 300 comprises a corresponding recess or recesses (not depicted) such that the protrusion(s) 450 are located within such recess(es) when the electronic module 300 is located in its installed position within the receptacle 400.

Such protrusion(s) 450 have the advantage of providing the electronic module 300 with additional mechanical support in its installed position within the receptacle 400, and thereby facilitate keeping the electronic module 300 firmly in its installed position within the receptacle 400.

According to an example, as illustrated in FIG. 6d, there may be a protrusion 450 such that the protrusion 450 laterally surrounds the first part 301 of the electronic module. That is, the protrusion 450 may encircle that part of the electronic module 300 which is housed within the receptacle 400.

The height $h_{450}$ of the protrusion(s) 450 may be, for example, at least 0.5 mm. That is, the protrusion(s) 450 may extend at least 0.5 mm, such as 0.5-10 mm, inwards from the inside of the wall(s) 402, in accordance with what is illustrated in FIGS. 6c and 6d.

While not specifically illustrated with variations, the protrusion(s) 450 may comprise a particular cross-sectional shape in order to promote, for example, the installability and/or the securing of the electronic module 300 into and/or in the receptacle 400. For example, such a cross-sectional shape may be semicircular, triangular or rectangular. While not specifically illustrated either, the protrusion(s) 450 may comprise a particular three-dimensional shape enabling mechanical locking. For example, such a three-dimensional shape may comprise positive and/or negative taper such as fish tail-type of locking. In said cases, the electronic module 300 comprises corresponding recesses (not illustrated) mechanically compatible with said shapes of the protrusion(s) 450.

According to another example (not specifically illustrated), the protrusion 450 may constitute a nut-like thread on the inside of a circular receptacle 400, i.e. on the inside of a circular wall 402. In such a case, the first part 301 of a circular electronic module 300 comprises a corresponding bolt-like thread such that the electronic module 300 may be installed into the receptacle 400 with a twisting motion.

As illustrated in FIGS. 6b and 6c, the inside floor 403 of the receptacle 400 may comprise a bulge 455. Such a bulge 455 may be used to provide guidance for the electronic module 300 with respect to the correct installed position of the electronic module 300 within the receptacle 400. In such a case, the electronic module 300 comprises a corresponding recess on its lower surface (not specifically illustrated). Such guidance may be beneficial if, for example, following installing the electronic module 300 in the receptacle 400, castable material is inserted between the electronic module 300 and the wall(s) 402 of the receptacle 400, as the electronic module 300 may be guidedly installed for example such that its clearance from the wall(s) 402 is substantially the same around its perimeter.

Figure 5B:
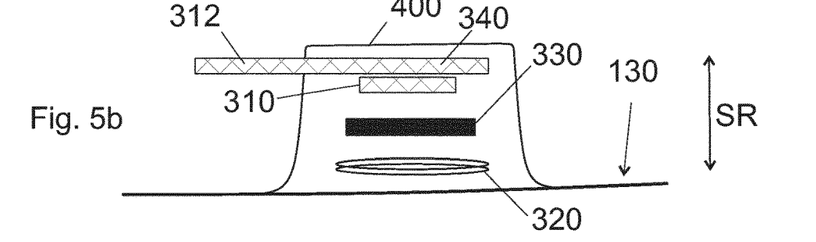
Figure 5C:
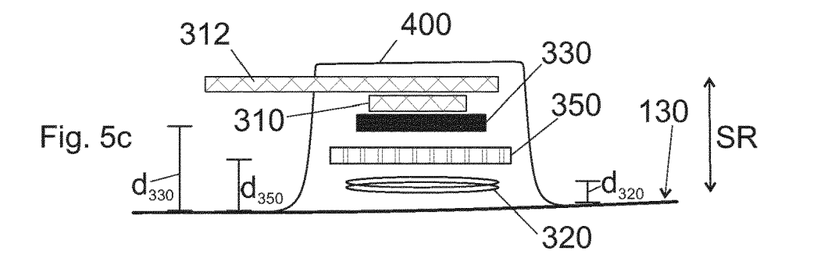
Figure 5D:
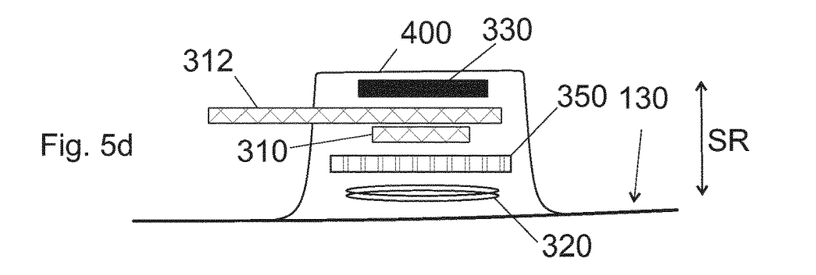
Figure 5E:
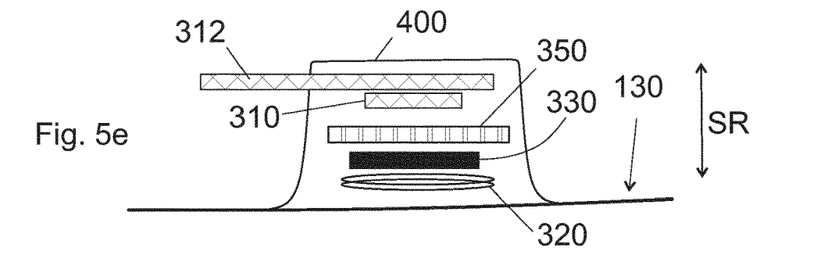

Now referring to FIGS. 5c-5e, it is preferable that the primary inductive component 320 of the electronic module 300 is magnetically shielded from the other components such as electronic components of the electronic module 300 in the interest of reducing or eliminating magnetic disturbance on the other components of the electronic module 300. Towards this end, the electronic module may comprise a component 350 made from paramagnetic of ferromagnetic material, such as ferrite. In order to provide said magnetic shielding, preferably the distance $d_{320}$ between the primary inductive component 320 and the inner surface 130 of the tire 100 is less than the distance $d_{350}$ between the component 350 made from paramagnetic or ferromagnetic material and the inner surface 130 of the tire 100, as denoted in FIG. 5c. That is, preferably the primary inductive component 320 is located, with respect to the radial direction SR, between the component 350 made from paramagnetic or ferromagnetic material and the inner surface 130 of the tire. Moreover, preferably the component 350 made from paramagnetic of ferromagnetic material is arranged closer to the inner surface 130 of the tire 100 than some electronic circuits, such as the communication circuit 310, of the electronic module 300.

The power source 330, for example a battery, serving as an energy source for the electronic module 300 may be located, with respect to the radial direction SR, either between the level of the antenna 312 and the inner surface 130 of the tire 100, as is the case in the example illustrated in FIGS. 5a-5c and 5e, or between the level of the antenna 312 and the second end 408 of the receptacle 400, as is the case in FIG. 5d. However, preferably at least one of the power source 330 and the component 350 made from paramagnetic of ferromagnetic material is located, with respect to the radial direction SR, between the level of the antenna 312 and the inner surface 130 of the tire 100. Nonetheless, in the interest of the power source 330 not disturbing the interaction between the primary inductive component 320 and the secondary inductive component 220, preferably the power source 330 is, with respect to the radial direction SR, not located between the primary inductive component 320 and the secondary inductive component 220. Therefore it is preferable that the distance $d_{320}$ between the primary inductive component 320 and the inner surface 130 of the tire 100 is less than the distance $d_{330}$ between the power source 330 and the inner surface 130 of the tire, as is the case in the examples illustrated in FIGS. 5a-5e.

It is preferable that the power source 330 is magnetically shielded from the primary inductive component 320 in the interest of reducing or eliminating any currents within the power source 330, such as a battery, induced by the magnetic field of the primary inductive component 320. Therefore, preferably the distance $d_{320}$ between the primary inductive component 320 and the inner surface 130 of the tire 100 is less than the distance $d_{350}$ between the component 350 made from paramagnetic or ferromagnetic material and the inner surface 130 of the tire 100, and, at the same time, the distance $d_{330}$ between the power source 330 and the inner surface 130 of the tire 100 is greater than the distance $d_{350}$ between the component 350 made from paramagnetic or ferromagnetic material and the inner surface 130 of the tire 100. That is, preferably the component 350 made from paramagnetic or ferromagnetic material is located, with respect to the radial direction SR, between the power source 330 and the primary inductive component 320 such that of said elements the primary inductive component 320 is closest to the inner surface 130 of the tire 100. FIGS. 5c-5e illustrate examples of such an arrangement.

In addition, when the electronic module 300 comprises the primary inductive component 320, preferably the primary inductive component 320 is closer to the inner surface 130 of the tire 100 than the communications circuit 310, as indicated according to examples in FIGS. 5a to 5e.

Now referring to FIGS. 3b and 5a-5b, in addition to reading sensing information from the passive circuit 200, or as an alternative to that, the electronic module 300 may comprise a sensor 340. Such a sensor 340 may be configured to sense a measure of interest such as pressure within or acceleration of the tire 100. Thus, such a sensor 340 may be, for example, a pressure sensor or an acceleration sensor. If the sensor 340 is to sense a measure of interest with respect to the interior of the tire 100, such as air pressure prevailing there, preferably the sensor 340 is exposed to the interior of the tire 100. Such exposure of the sensor 340 to the interior of the tire 100 may be, for example, via the first opening 410 of the receptacle 400. Such a sensor 340 may be, for example, incorporated in or coupled with the communications circuit 310 or the antenna 312 of the electronic module 300.

The invention claimed is:

1. A tire, comprising:
a receptacle connected to an inner surface of the tire,
an electronic module comprising a primary inductive component and an electric power source comprising a battery and/or an energy harvesting device, and
a passive circuit comprising:
a secondary inductive component, and
a secondary capacitive component, wherein the primary inductive component and the secondary inductive component are electromagnetically connected,
wherein;
the receptacle comprises a wall or walls, which limits or limit at least a first opening and a second opening,
a part of the electronic module extends through at least the second opening such that the wall or walls of the receptacle laterally surrounds or surround only a first part of the electronic module such that at least a second part of the electronic module is arranged outside the receptacle,
a first end of the receptacle is connected to the inner surface of the tire, and
a second end of the receptacle, which is opposite to the first end, limits the first opening, the second opening opens to a side of the receptacle,
a part of the wall or walls is arranged in between the second end of the receptacle and the second opening,
the first opening is dimensioned such that the first opening allows for installing the electronic module into the receptacle via the first opening such that after such installing, a part of the electronic module resides outside the receptacle by way of extending through at least the second opening, and
the electronic module comprises an antenna such that the second part of the electronic module comprises at least a part of the antenna and such that the part of the antenna that is arranged outside the receptacle is electrically connected to the first part of the module.

2. The tire of claim 1, comprising a reinforcing belt arranged in between the primary inductive component and the secondary inductive component.

3. The tire of claim 1, wherein the receptacle comprises a flange extending laterally outward from the wall or walls of the receptacle, wherein the flange is connected to the inner surface of the tire.

4. The tire of the claim 3, wherein a cross sectional area of the flange is at least 5% greater than a cross sectional area of a second end of the receptacle, wherein the second end is opposite to the flange.

5. The tire of claim 1, wherein the wall or walls of the receptacle comprises or comprise at least one protrusion protruding towards to first part of the electronic module, which is laterally surrounded by the wail or walls of the receptacle.

6. The tire of claim 5, wherein the protrusion laterally surrounds the first part of the electronic module.

7. The tire of claim 5, wherein a height the protrusion is at least 0.5 mm.

8. The tire of claim 1, wherein the inner sides of the wall or walls comprise surface roughness.

9. The tire of claim 1, wherein an inside floor of the receptacle comprises a bulge.

10. The tire of claim 1, wherein the electronic module comprises
a pressure sensor or an acceleration sensor.

11. The tire of the claim 10, wherein the sensor is exposed to an interior of the tire via the first opening.

12. The tire of claim 1, wherein the receptacle has been connected to the inner surface of the tire by adhesive or vulcanization.

13. The tire of the claim 1, wherein
the wall or walls of the receptacle limits or limit a third opening,
a part of the wall or walls is arranged in between the second end of the receptacle and the third opening, and
at least a third part of the electronic module is arranged outside the receptacle such that a part of the electronic module extends through the third opening.

14. A tire, comprising:
a receptacle connected to an inner surface of the tire, and
an electronic module,
wherein:
the receptacle comprises a wall or walls, which limits or limit at least a first opening and a second opening,
a part of the electronic module extends through at least the second opening such that the wall or walls of the receptacle laterally surrounds or surround only a first part of the electronic module such that at least a second part of the electronic module is arranged outside the receptacle,
a first end of the receptacle is connected to the inner surface of the tire, and
a second end of the receptacle, which is opposite to the first end, limits the first opening, the second opening opens to a side of the receptacle,
a part of the wall or walls is arranged in between the second end of the receptacle and the second opening,
the first opening is dimensioned such that the first opening allows for installing the electronic module into the receptacle via the first opening such that after such installing, a part of the electronic module resides outside the receptacle by way of extending through at least the second opening,
the electronic module comprises an antenna such that the second part of the electronic module comprises at least a part of the antenna and such that the part of the antenna that is arranged outside the receptacle is electrically connected to the first part of the module, and
the receptacle comprises a flange extending laterally outward from the wall or walls of the receptacle, wherein the flange is connected to the inner surface of the tire.

15. The tire of the claim 14, wherein a cross sectional area of the flange is at least 5% greater than a cross sectional area of a second end of the receptacle, wherein the second end is opposite to the flange.

16. A tire, comprising:
a receptacle connected to an inner surface of the tire, and
an electronic module,
wherein:
the receptacle comprises a wall or walls, which limits or limit at least a first opening and a second opening,
a part of the electronic module extends through at least the second opening such that the wall or walls of the receptacle laterally surrounds or surround only a first part of the electronic module such that at least a second part of the electronic module is arranged outside the receptacle,
a first end of the receptacle is connected to the inner surface of the tire, and
a second end of the receptacle, which is opposite to the first end, limits the first opening, the second opening opens to a side of the receptacle,
a part of the wall or walls is arranged in between the second end of the receptacle and the second opening,
the first opening is dimensioned such that the first opening allows for installing the electronic module into the receptacle via the first opening such that after such installing, a part of the electronic module resides outside the receptacle by way of extending through at least the second opening,
the electronic module comprises an antenna such that the second part of the electronic module comprises at least a part of the antenna and such that the part of the antenna that is arranged outside the receptacle is electrically connected to the first part of the module,
the wall or walls of the receptacle comprises or comprise at least one protrusion protruding towards to first part of the electronic module, which is laterally surrounded by the wail or walls of the receptacle and po1 the protrusion laterally surrounds the first part of the electronic module.

17. A tire, comprising:
a receptacle connected to an inner surface of the tire, and
an electronic module,
wherein:
the receptacle comprises a wall or walls, which limits or limit at least a first opening and a second opening,
a part of the electronic module extends through at least the second opening such that the wall or walls of the receptacle laterally surrounds or surround only a first part of the electronic module such that at least a second part of the electronic module is arranged outside the receptacle,
a first end of the receptacle is connected to the inner surface of the tire, and
a second end of the receptacle, which is opposite to the first end, limits the first opening, the second opening opens to a side of the receptacle,
a part of the wall or walls is arranged in between the second end of the receptacle and the second opening,
the first opening is dimensioned such that the first opening allows for installing the electronic module into the receptacle via the first opening such that after such installing, a part of the electronic module resides outside the receptacle by way of extending through at least the second opening,
the electronic module comprises an antenna such that the second part of the electronic module comprises at least a part of the antenna and such that the part of the antenna that is arranged outside the receptacle is electrically connected to the first part of the module, and
an inside floor of the receptacle comprises a bulge.

* * * * *